United States Patent [19]

Ueyoko et al.

[11] Patent Number: 5,253,690

[45] Date of Patent: * Oct. 19, 1993

[54] HIGH SPEED HEAVY DUTY TIRE INCLUDING BEAD PART WITH SIDE PACKING RUBBER

[75] Inventors: Kiyoshi Ueyoko, Osaka; Mikio Takatsu, Takarazuka; Hiroshi Hoshino, Kobe, all of Japan

[73] Assignee: Sumitomo Rubber Industries, Ltd., Kobe, Japan

[*] Notice: The portion of the term of this patent subsequent to Nov. 3, 2009 has been disclaimed.

[21] Appl. No.: 804,998

[22] Filed: Dec. 10, 1991

Related U.S. Application Data

[63] Continuation-in-part of Ser. No. 632,006, Dec. 21, 1990, Pat. No. 5,160,384.

[30] Foreign Application Priority Data

Dec. 28, 1989 [JP] Japan .................. 1-344638
Dec. 10, 1990 [JP] Japan .................. 2-410004

[51] Int. Cl.⁵ .................. B60C 13/00; B60C 15/00; B60C 15/06
[52] U.S. Cl. .................. 152/525; 152/454; 152/543; 152/546; 152/547
[58] Field of Search .................. 152/513, 547, 525, 454, 152/546

[56] References Cited

U.S. PATENT DOCUMENTS

| | | | |
|---|---|---|---|
| 3,406,733 | 10/1968 | Boileau | 152/547 X |
| 4,051,083 | 9/1977 | Newman | 152/525 X |
| 4,215,737 | 8/1980 | Motomura et al. | 152/547 X |
| 4,387,759 | 6/1983 | Obata et al. | 152/543 X |
| 4,953,605 | 9/1990 | Kawamura et al. | 152/547 X |

FOREIGN PATENT DOCUMENTS 0435622 7/1991 European Pat. Off. .......... 152/547

*Primary Examiner*—Michael W. Ball
*Assistant Examiner*—Adrienne C. Johnstone

[57] ABSTRACT

A high speed heavy duty tire with improved bead durability, which includes: a bead core disposed in each of the bead portions; a radial carcass extending between the bead portions and turned up around the bead cores to form two turned up portions and one main portion therebetween; a belt disposed radially outside the carcass; a tapered bead apex disposed between the main portion and each turned up portion of the carcass and extending radially outwardly; and a sidewall disposed on each side of the carcass and extending from the bead base to the tread edge, wherein the sidewall comprises a lower sidewall and an upper sidewall, the lower sidewall extending radially outwardly from the bead base over a height corresponding to the radially outermost edge of a flange of the tire's regular rim, and the upper sidewall extending radially outwardly from the radially outer edge of the lower sidewall. Each bead portion is provided between the carcass and the lower sidewall with a side packing of small thickness, the side packing is made of rubber having a 100% modulus MP of 53 to 95 kg/sq.cm., the bead apex is made of rubber having a 100% modulus MA of 78 to 120 kg/sq.cm., the lower sidewall is made of rubber having a 100% modulus MC of 40 to 70 kg/sq.cm., the upper sidewall is made of rubber having a 100% modulus MS of 10 to 45 kgf/sq.cm., and these 100% modulus values MP, MA, MC and MS are in the relation of MS<MC<MP<MA.

2 Claims, 3 Drawing Sheets

HIGH SPEED HEAVY DUTY TIRE INCLUDING BEAD PART WITH SIDE PACKING RUBBER

This application is a continuation-in-part of application Ser. No. 07/632,006 filed on Dec. 21, 1990, now U.S. Pat. No. 5,160,384. The entire contents of which are hereby incorporated by reference.

The present invention relates to a pneumatic tire for high speed and heavy duty use, in which bead durability is improved.

BACKGROUND OF THE INVENTION

Recently, in tires for heavy duty and high speed use such as aircraft tires, a radial ply carcass has become used for structural durability, running performance and low fuel consumption.

For such aircraft tires, however, since they are used under conditions of high internal pressure, heavy load and high speed, a greater durability is required compared to tires used in other fields. Especially the bead is likely to be peeled apart or damaged in the carcass end part and its vicinity due to the strain caused by bending deformation by large loads at the time of taking off or landing.

Therefore, it has hitherto attempted to suppress bending deformation by enhancing the bead rigidity by increasing the bead volume by using reinforcement layers made of organic or inorganic fiber cords.

In such rigidity reinforcing measures, however, the internal heat generation due to bending deformation could not be decreased, and satisfactory preventive effects of bead portion damages were not obtained.

The present inventors accordingly studied the bending deformation of the bead portion by carrying out take-off taxi simulation tests and other similar tests conforming to the Federal Aviation Administration Technical Standard Order TSO-C62c. As a result, comparing the tire bead portion A0 without load and the tire bead portion A1 with specified load as shown in FIG. 2, mounted on its specified rim R and inflated to its specified internal pressure, it was found that the internal heat generation of the bead portion is lower when the bead deformation $h0-h1$ is smaller, where $h0-h1$ is the difference between the initial height $h0$ and the loaded height $h1$, i.e. the length between the outer surface of the beads A0 and A1 on the vertical line set up from the outer edge of the Phn flange Ra, and the upper edge of the rim flange Ra as shown in FIG. 3.

The present inventors carried out further research, and discovered that by employing high modulus rubber as a bead apex, the loaded height $h1$ is increased without practically changing the initial height $h0$, and thereby the bead deformation $h0-h1$ is decreased, and that by decreasing the modulus from the inside to the outside in the tire axial direction, the shearing stress occurring in the bead in the loaded state can be lessened to enhance the bead durability.

SUMMARY OF THE INVENTION

It is therefore, a primary object of the present invention to provide a high speed heavy duty tire in which bending deformation of the bead portion bead heat generation, and bead damage such as rim chafing are reduced to improve the bead durability.

According to one aspect of the present invention, a high speed heavy duty tire comprises
a bead core disposed in each of the beads,
a radial carcass extending between the beads and turned up around the bead cores to form two turned up portions and one main portion therebetween,
a belt disposed radially outside the carcass,
a tapered bead apex disposed between the main portion and each turned up portion of the carcass and extending radially outwardly from the bead core, and
a sidewall disposed on each side of the carcass and extending from the bead base to the tread edge, wherein
the sidewall comprises a lower sidewall and an upper sidewall, the lower sidewall extending radially outwardly from the bead base over a height corresponding to the radially outermost edge of a flange of its regular rim, the upper sidewall extending radially outwardly from the radially outer edge of the lower sidewall,
a side packing of small thickness is disposed between the carcass and the lower sidewall,
the side packing is made of rubber having a 100% modulus MP of 53 to 95 kg/sq.cm,
the bead apex is made of rubber having a 100% modulus MA of 78 to 120 kg/sq.cm,
the lower sidewall is made of rubber having a 100% modulus MC of 40 to 70 kg/sq.cm,
the upper sidewall is made of rubber having a 100% modulus MS of 10 to 45 kgf/sq.cm, and
these 100% modulus values MP, MA, MC and MS are in the relation of $MS<MC<MP<MA$.

Preferably, the radial height HP of the radially outer edge of the side packing from the bead base line is larger than the radial height HA of the radially outer edge of the bead apex from the bead base line, and the height HP is smaller than $\frac{1}{2}$ of the tire section height H, and the height HA is larger than the radial height HR of the radially outer edge of the rim flange from the bead base line.

BRIEF DESCRIPTION OF THE DRAWINGS

An embodiment of the present invention will now be described in detail, by way of example only, in conjunction with the attached drawings, in which.

DETAILED DESCRIPTION OF THE INVENTION

Figure 1:
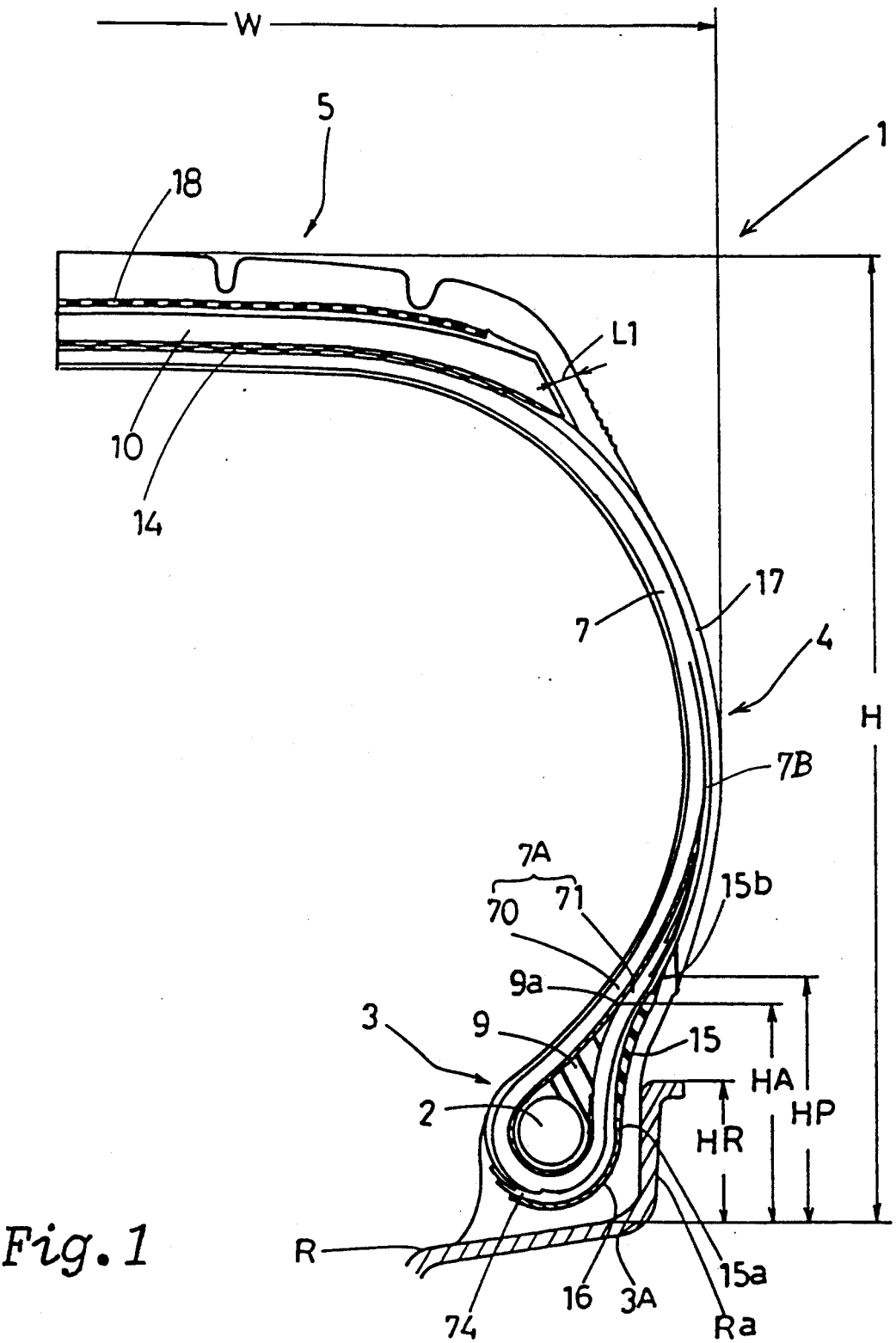
FIG. 1 is a cross sectional view of a tire according to the invention.
Figure 2:
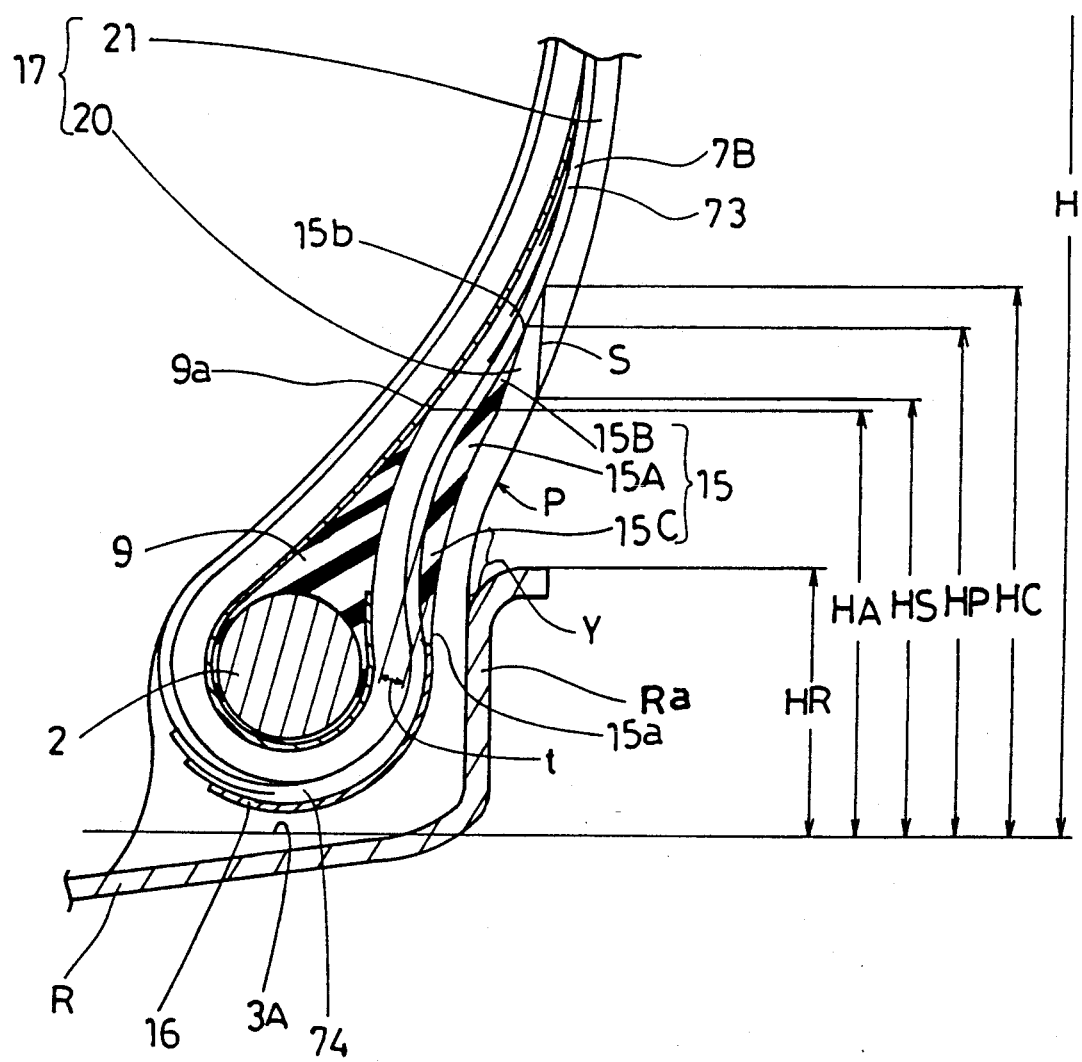
FIG. 2 is an enlarged cross sectional view of the bead thereof.
Figure 3:
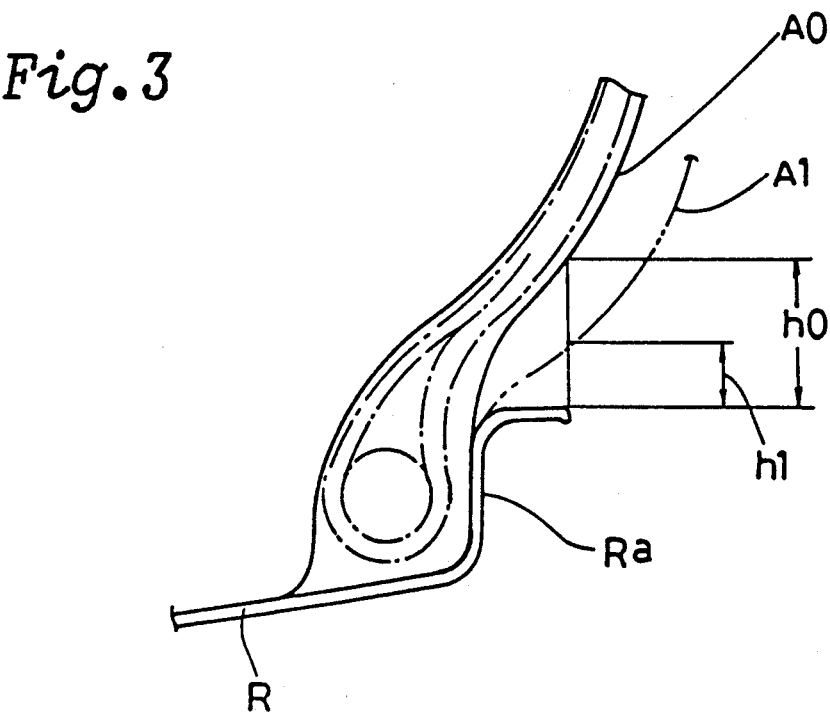
FIG. 3 is a schematic cross sectional view showing the bending deformation of the bead.
Figure 4:
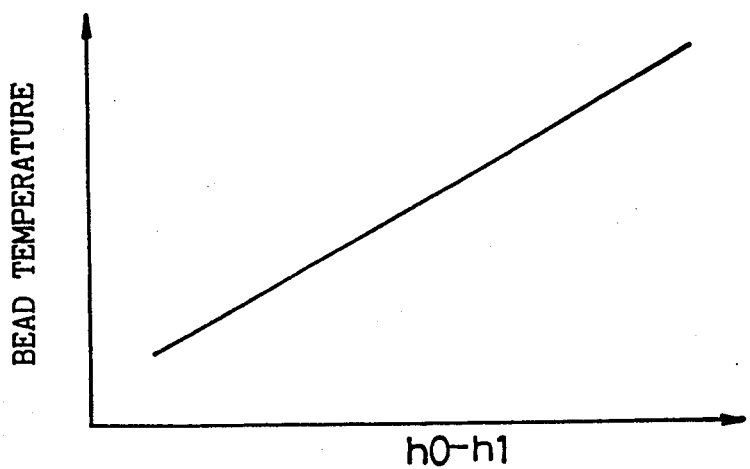
FIG. 4 is a diagram showing the relationship between the bead outer face heights h0, h1 and the resultant bead temperature.

In FIGS. 1 and 2, the tire 1 is a 46×17R20 radial aircraft tire. There is shown its normally inflated but unloaded state in which the tire is mounted on its specified rim R with no tire load and inflated to its specified internal pressure.

The tire 1 has a tread portion 5, a pair of axially spaced bead portions 3 and a pair of sidewall portions 4 extending therebetween.

The tire comprises an annular bead core 2 disposed in each bead portion 3, a toroidal carcass 7 extending between the bead portions 3 and turned up around the bead cores 2.

The carcass 7 in this embodiment is composed of an inner carcass 7A and an outer carcass 7B disposed on the outside of the inner carcass 7A.

The inner carcass 7A comprises a plurality of plies, in this example four plies, turned up around the bead cores 2 from the inside to the outside of the tire to form two turned up portions 71 and one main portion 70 therebetween.

The outer carcass 7B comprises a plurality of plies, in this examples two plies, turned up around the bead cores 2 from the outside to the inside of the tire to cover the turned up portions 71 of the inner carcass 7A.

The radially inner edge portion 74 of the outer carcass 7B is terminated at a position radially inward of the bead core center within the bead base rubber.

For the carcass plies in this embodiment, organic fiber carcass cords, e.g. rayon, polyester, vinylon, nylon, aromatic polyamide and the like, are used.

The cords in each carcass ply are arranged radially at an angle of 70 to 90 degrees to the tire equator.

In this example, the carcass plies (or cords) are inclined alternately with respect to the tire equator from the innermost ply to the outermost ply so as to cross each other between the adjacent carcass plies.

The tread portion 5 is provided with belt reinforcements 10, 14 and 18 disposed radially outside the carcass crown and inside the tread rubber.

In this example, the belt reinforcements includes a radially inner most cut breaker belt 14 disposed on the carcass, a band belt 10 disposed on the cut breaker belt 14, and a radially outermost protective belt 18 disposed radially outside the band belt 10.

The cut breaker belt 14 is composed of two piles.

The width of the cut breaker belt 14 is in the range of 65 to 85%, more preferably in the range of 70 to 78% of the maximum tire section width W.

Edge portions of the cut breaker belt 14 are spaced apart from the carcass, and the distance therebetween is gradually increased toward the belt edges.

The middle band belt 10 is composed of eight piles of cords. The width of the band belt 10 is in the range of about 70 to 85% of the maximum tire section width W, and slightly larger than that of the cut breaker belt 14.

The edges of the band belt plies are aligned in a slanting line almost parallel with the tire outer surface at the shoulder region as shown in FIG. 1, and the minimum distance L1 therebetween is in the range of about 3 to 15 mm.

The band belt cords are laid at angles of 0 to 20 degrees to the tire equator, and high elastic modulus cords are used therefor.

The protective belt 18 is narrower in width than the band belt 10, but has a enough width to cover most part of the band belt to provide a cutting resistance.

Each of the bead portions 3 is provided with a rubber bead apex 9 between the carcass main portion 70 and each turned up portion 71 of the inner carcass 7A. The bead apex 9 extends and is tapered radially outwardly from the bead core 2.

Further, each bead portion 3 is provided with a side packing rubber 15 with a small thickness disposed on and extending along the outer surface of the carcass, that is, the outer surface of the main portion of the outer carcass 7B.

The side packing rubber 15 in this example has, as shown in FIG. 2, tapered edge portions 15B and 15C one on each side of its main portion 15A in which the maximum thickness (t) lies, and the cross sectional shape thereof is generally a crescent shape.

Preferably, the maximum thickness (t) is 2.5 mm to 4.5 mm and 10 to 18% of the mean diameter of the bead core.

The position of the side packing rubber 15 is such that its central main portion 15A is located immediately axially inside a point P on the outer surface of the tire, where the point P is a point of inflection between the axially outwardly swelling surface of the sidewall lower portion and the axially inwardly swelling surface of the bead upper portion.

The radially inner edge 15a of the side packing 15 is terminated at a position radially inward of the radially outer edge of the bead core 2.

Further, a reinforcement filler 16 is disposed radially inside the side packing 15 to be jointed at the radially outer edge with the edge 15a. The reinforcement filler 16 extends along the outer carcass 7B toward the inside of the tire and terminated at a position axially outward of the outer carcass edge.

A rubber sidewall 17 is disposed on each side of the carcass 7. The sidewall 17 extends from the bottom of the bead portion 3 to the edge of the tread portion 5 through the sidewall portion 4, with defining the side surface of the tire, thereby covering the above-mentioned side packing rubber 15.

Each sidewall 17 is composed of two materially different parts, a radially inner part 20 and a radially outer part 21 (hereinafter called "lower sidewall 20" and "upper sidewall 21", respectively).

The lower sidewall 21 extends over the radially outer edge of the rim flange RA from the bead bottom to an enough height to avoid the contact of the upper sidewall 21 with the rim flange Ra in a largely deflected state of the tire under an extremely heavy tire load condition. Therefore, the radially outward extent of the lower sidewall 20 is determined so as to include such part (Y) that is located adjacent to the flange top which is bent axially outwardly, and does not contact therewith in the unloaded state, but contacts when the tire is mounted on its regular rim R and inflated to its regular pressure and loaded with a 200% load of its regular load.

The 100% modulus MP of the side packing rubber is 53 to 95 kg/sq.cm, the 100% modulus MA of the bead apex rubber is 78 to 120 kg/sq.cm, the 100% modulus MC of the lower sidewall rubber is 40 to 70 kg/sq.cm, and the 100% modulus MS of the upper sidewall rubber is 10 to 45 kg/sq.cm.

Further, the moduli MP, MA, MC and MS are defined in a relation of MS<MC<MP<MA.

The above-mentioned 100% modulus and the elongation (%) and stress (kg/sq.cm) both at rupture, of these rubber layers 9, 15, 20 and 21 and topping rubber for the carcass 7 are summarized in Table 1.

TABLE 1

|  | 100% modulus | Elongation at rupture | Stress at rupture |
| --- | --- | --- | --- |
| Bead apex | 78–120 | 150–200 | 120–160 |
| Side packing | 53–95 | 250–350 | 200–250 |
| Lower sidewall | 40–70 | 200–350 | 100–250 |
| Upper sidewall | 10–45 | 450–600 | 150–230 |
| Carcass topping rubber | 40–70 | 200–350 | 150–300 |

As the hard rubber with a 100% modulus of 78 to 120 kg/sq.cm is used for the bead apex 9, the rigidity of the bead is increased to decrease the bead deformation h0−h1.

Further, the lower sidewall 20 is made of relatively soft rubber with a 100% modulus of 40 to 70 kg/sq.cm, and the side packing 15 with a 100% modulus of 53 to 95 kg/sq.cm which is smaller than that of the bead apex 9 and greater than that of the lower sidewall 20 is disposed between the bead apex and lower sidewall, whereby the bead rigidity is increased while decreasing the stepped changes in rigidity and shearing stress is alleviated to enhance the bead durability.

Further, as the 100% modulus of the lower sidewall 20 is at least 40 kg/sq.cm, external damages such as rim chafing caused by tire deflection can be reduced.

In this way, bead damage can be effectively prevented by the synergistic actions of the effects of the decreased bending stress and decreased heat generation owing to the decreased bead deformation and the shearing stress alleviating effect.

Furthermore, the radial height HP of the radially outer edge 15b of the side packing 15 is larger than the radial height HA of the radially outer edge 9a of the bead apex 9 and smaller than ½ of the tire section height being measured H, each height from the bead base line 3A.

The height HA of the bead apex 9 is larger than the radial height HR of the radially outer edge of the rim flange RA from the bead base line 3A.

To increase the bending rigidity of the bead, it is required that the height HA of the bead apex 9 is larger than the height HR of the rim flange Ra.

Further, by setting the height HP of the radially outer edge 15b of the side packing 15 larger than the height HR, the bending rigidity of the bead is effectively increased.

It is, meanwhile, now necessary to set this height HP larger than ½ of the tire section height H.

The lower sidewall 20 must cover the entire side packing 15, therefore the radial height HC of the radially outer edge thereof from the bead base line 3A is larger than the height HP of the side packing 15. However, if the height HC is excessively large, the lower sidewall becomes difficult to follow the deformation of the sidewall 4. Therefore, the difference HC−HP is preferably set to be 0.5 to 2.5 times the thickness of the lower sidewall 20.

Further, the radially outer edge portion of the lower sidewall 20 and the radially inner edge portion of the upper sidewall 21 are tapered and overlap jointed so that at the joint (S) the upper sidewall is located axially outward of the lower sidewall, and the height HS of the radially inner edge of the upper sidewall from the bead base line 3A is smaller than the height HP, whereby the bonding area increases and the modulus changes gradually so as to prevent separation between the lower and upper sidewalls.

The radially outer edge portion of the upper sidewall 21 is tapered and disposed between the carcass and the edge of the belt, in this example the breaker belt 14.

Aircraft tires of size 46×17R20 having the tire structure shown in FIG. 1 were prepared, wherein the bead apexes, side packings, lower sidewalls and upper sidewalls were varied in 100% modulus as shown in Table 2.

The test tires were subjected to the taxi simulation condition tests (load 100%) to measure the bead durability in accordance with the Federal Aviation Administration Technical Standard Order TSO-C62c.

The results are shown in Table 2 by an index taking the embodiment as 100. The greater the index, the better.

TABLE 2

| Tire | 100M | Result | Evaluation |
|---|---|---|---|
| Ex. | MA>MP>MC | completed 300 test cycles | 100 |
| Ref. 1 | MA>MC>MP | Looseness occurred in the initial stage of Test between the carcass ply and side packing rubber at the flange contact region of the bead | 30 |
| Ref. 2 | MP>MC>MA | Looseness occurred in the initial stage of Test between the carcass ply and side packing rubber at the flange contact region of the bead | 40 |
| Ref. 3 | MC>MP>MA | Looseness occurred in the initial stage of Test between the carcass ply and side packing rubber at the flange contact region of the bead | 30 |
| Ref. 4 | MA>MP=MC | completed 300 test cycles, but Looseness occurred in the inner carcass plies | 80 |

MA: Bead apex rubber
MP: Side packing rubber
MC: Lower sidewall rubber

The embodiments are seen to be excellent in bead durability. Further, as compared with the reference tire 2, the embodiment was lower in bead temperature by about 5 deg. C under the same conditions, and the bead deformation was decreased by 1 to 1.5%. Furthermore, no damage such as rim chafing and crack was found on the inspection after the test running.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. A high speed heavy duty tire and rim assembly comprising
   a rim, said rim having a flange with a radially outermost edge; and
   a tire, said tire including:
   a pair of bead portions, each of said bead portions having a bead core disposed therein,
   a pair of sidewall portions,
   a radial carcass extending between said pair of bead portions and turned up around the bead cores to form two turned up portions and one main portion therebetween,
   a belt disposed radially outside of the carcass,
   a tapered bead apex disposed between the main portion and each turned up portion of the carcass and extending radially outward from each of the bead cores,
   a tread, the tread having a pair of tread edges, and
   a sidewall disposed axially outside of the carcass in each of said sidewall portions and extending from the bead base of said bead portion to one of said pair of tread edges,
   the sidewall including a lower sidewall and an upper sidewall, the lower sidewall extending radially outwardly from the bead base over a height corresponding to said radially outermost edge of said flange, the upper sidewall extending radially out- wardly from the radially outer edge of the lower sidewall, each of said bead portions being provided with a reinforcement filler, said filler extending from radially beneath the bead core and terminating in an upper end axially outward of the bead core, and a side packing rubber of small thickness, said side packing rubber extending radially outwardly from the upper end between the carcass and the lower sidewall, the side packing rubber having a 100% modulus MP of 53 to 95 kg/sq.cm, the bead apex made of rubber having a 100% modulus MA of 78 to 120 kg/sq.cm, the lower sidewall made of rubber having a 100% modulus MC of 40 to 70 kg/sq.cm, the upper sidewall made of rubber having a 100% modulus MS of 10 to 45 kgf/sq.cm, and these 100% modulus values MP, MA, MC and MS being in the relation of MS<MC<MP<MA.

2. The tire and rim assembly according to claim 1, wherein the radial height HP of the radially outer edge of the side packing rubber from a bead base line is larger than the radial height HA of the radially outer edge of the bead apex from the bead base line, and the height HP is smaller than ½ of a tire sectional height H, and the height HA is larger than the radial height HR of the radially outer edge of the rim flange from the bead base line.

* * * * *